United States Patent [19]

Myers

[11] 3,899,413

[45] Aug. 12, 1975

[54] PLATINUM-GERMANIUM-GOLD REFORMING CATALYST AND PROCESS

[75] Inventor: John W. Myers, Bartlesville, Okla.

[73] Assignee: Phillips Petroleum Company, Bartlesville, Okla.

[22] Filed: May 17, 1973

[21] Appl. No.: 361,243

[52] U.S. Cl. ............... 208/138; 208/139; 252/439; 252/441; 252/466 PT
[51] Int. Cl..... C10g 35/06; B01j 11/74; B01j 11/08
[58] Field of Search ............ 208/138, 139; 252/441, 252/466 PT

[56] References Cited
UNITED STATES PATENTS

| | | | |
|---|---|---|---|
| 2,906,701 | 9/1959 | Stine et al. | 208/138 |
| 2,911,357 | 11/1959 | Myers et al. | 208/138 |
| 3,632,503 | 1/1972 | Hayes | 208/138 |
| 3,729,408 | 4/1973 | Carter et al. | 208/138 |
| 3,775,300 | 11/1973 | Hayes | 208/138 |
| 3,775,301 | 11/1973 | Hayes | 208/139 |
| 3,781,221 | 12/1973 | Kominami et al. | 208/138 |

Primary Examiner—Delbert E. Gantz
Assistant Examiner—S. Berger

[57] ABSTRACT

An improved catalyst comprising a refractory support and platinum promoted with both gold and germanium exhibits increased activity and selectivity characteristics for the dehydrocyclization and reforming of hydrocarbons.

9 Claims, No Drawings

PLATINUM-GERMANIUM-GOLD REFORMING CATALYST AND PROCESS

This invention relates to reforming hydrocarbons. In accordance with another aspect, this invention relates to platinum-type catalysts promoted with gold and germanium. In accordance with another aspect, this invention relates to the conversion of hydrocarbons using the improved catalyst. In accordance with a further aspect, this invention relates to the reforming of naphthas by contacting with an alumina supported platinum promoted with gold and germanium whereby substantially complete conversion of the feed hydrocarbon is realized with high selectivity to desired components.

Platinum-type catalyst have come into commercial use in the conversion of hydrocarbons. Catalysts containing platinum and described in the literature have been used commercially for the reforming of naphthas. A well-known disadvantage of such catalysts in reforming, however, is their tendency to lose activity after a period in use at elevated temperatures which is particularly short when the catalyst is subjected to periodic regeneration by oxidation to remove carbonaceous deposits formed during the hydrocarbon conversion. Most catalytic reforming processes operate at high reaction pressures in order to control coke deposition and catalyst deactivation. When reforming at low pressures, conventional catalysts rapidly foul and become deactivated, thereby preventing the reforming processes from operating for long on stream periods. Thus, extensive research has been devoted to the development of low pressure reforming processes and catalysts for use therein since the low pressure processes result in substantial increase in yields of gasoline products of high octane rating.

The problem is to find an inexpensive catalyst system for dehydrocyclization and naphtha reforming which can be used at relatively low pressures where such reforming results are favorable yet which will not be rapidly deactivated by long use at such low pressures. Higher temperatures could be used to overcome this deactivation but this would increase side reactions such as hydrocracking. Platinum and gold promoted catalysts are known. Platinum and germanium catalysts are also known. The invention comprises promoting a platinum catalyst with both gold and germanium to obtain an active, less expensive catalyst.

Accordingly, an object of this invention is to provide an improved platinum-type catalyst.

Another object of this invention, is to increase the activity and selectivity of platinum-type catalysts for reforming.

Another object of this invention is to provide an improved hydrocarbon conversion process.

A further object of this invention is to provide an improved process for the reforming of naphthas.

Other objects and aspects as well as the several advantages of the invention will be apparent to those skilled in the art upon reading the specification and the appended claims.

In accordance with the invention, refractory supported platinum-type catalysts are improved in activity and selectivity by incorporating therein a finite amount of gold and germanium.

Further in accordance with the invention, hydrocarbons are reformed by contacting with a supported platinum-type catalyst promoted with germanium and gold which exhibits increased activity and selectivity for reforming reactions.

In accordance with a specific embodiment, alumina promoted with platinum, gold and germanium effectively converts naphtha fractions into reformed products having increased octane ratings.

The catalyst of the invention consists essentially of a small, but finite, amount of each of platinum, germanium and gold incorporated into a refractory support such as alumina. The catalyst compositions of the invention generally contain from 0.05 to 2 weight percent of each of platinum, germanium and gold, with the remainder being a refractory support, with the preferred amounts of the promoters being in the range of 0.1 to 1 weight percent of each platinum, germanium and gold, with the remainder being a refractory support such as alumina. It is more generally preferred for practical reasons in the reforming of naphthas to use catalysts containing from 0.1 to 0.8 weight percent platinum, from 0.1 to 0.6 weight percent gold and from 0.1 to 0.5 weight percent germanium, the remainder being a refractory support such as alumina. A particularly effective catalyst that has been utilized contains 0.4 weight percent platinum, 0.3 to 0.6 weight percent gold and 0.3 weight percent germanium with the remainder alumina.

Although other refractory materials can be used, alumina including both gamma-alumina and eta-alumina is preferred. Other refractory materials such as silica, titanium, zirconia, zinc oxide, etc. and combinations thereof can be utilized when desired.

CATALYST PREPARATION

Any convenient and conventional method of preparation can be used although impregnation of the support with solutions and/or slurries of the promoting metal-components is preferred. The choice of available, and soluble, platinum, gold and germanium compounds is somewhat limited. Suitable gold and platinum compounds include the halides or the chloro acids such as chloroplatinic acid and chloroauric acid. Suitable germanium compounds include the halides, particularly the tetrachloride and the oxychloride and the like.

After impregnation the composite is dried and then activated in air, hydrogen or inert gases at elevated temperatures in the range of about 600°F to about 1200°F and more preferably in the range of about 800°F to about 1000°F. If desired, the catalyst can be further promoted for reforming by the addition of halides such as chlorides. The catalyst can be further conventionally treated with reducing agents and sulfiding agents or to combinations of these.

CATALYST REGENERATION

The catalyst is relatively long lasting but occasional regeneration is needed. It is carried out by first burning off the carbon with a gas containing a low oxygen concentration. The catalyst is then reactivated following the procedure described above.

These catalysts are especially effective in the reactions involved in naphtha reforming including dehydrogenation, dehydrocyclization, isomerization, and hydrogenation, and have exhibited increased activity and selectivity for the conversion, for example, of paraffins to aromatics.

The catalysts of the present invention are particularly applicable to the dehydrocyclization and reforming of hydrocarbons including acyclic and cyclic paraffins, particularly naphthenes and paraffins. The catalysts are particularly suitable for the reformation of paraffins containing six or more carbon atoms per molecule including n-hexane, methylhexane, n-heptane, dodecane, and the like. Some examples of naphthenes which can be reformed with these catalysts are methylcyclopentane, cyclohexane, and the like. Some olefins can also be present in the feedstock. The preferred feeds are $C_6$–$C_{12}$ paraffins and $C_6$–$C_{12}$ naphthenes. They can be employed for the reformation of mixtures of paraffins and naphthenes such as are obtained from the distillation of straight run or natural gasolines. Most often, refinery streams containing such materials and boiling in the range of about 150°–400°F are used. Low sulfur containing feeds are generally preferred.

In utilizing the catalysts of the instant invention for the dehydrocyclization and reforming of the foregoing hydrocarbons, the hydrocarbons to be reformed are contacted with the catalyst of the invention at a temperature, pressure and flow rate of hydrocarbon feedstock in the presence of hydrogen to convert the hydrocarbon feedstock to the desired reformed product. The conditions employed will vary appreciably depending upon the hydrocarbon feedstock and other conditions. Generally, the temperature employed will be in the range 600°–1100°F, preferably 700°–1050°F, in the presence of hydrogen. The hydrogen rate during reforming will ordinarily range from 0.5–20 moles hydrogen per mole of hydrocarbon.

The pressure in the reforming reaction zone for purposes of the present invention will generally not exceed about 600 psig. Preferably, the pressure will be in the range 100–400 psig.

The hydrocarbon feed rate for use in the present invention, i.e., the liquid hourly space velocity (LHSV), is in the range 0.2–10, preferably 0.5–5 LHSV.

The temperature to be employed in the reforming process will be determined largely by other operating conditions, that is, at a particular pressure, liquid hourly space velocity and hydrogen to hydrocarbon ratio, the temperature is normally determined by the desired octane number of the product to be produced.

In utilizing the catalyst of the invention for reforming hydrocarbons, the reforming reaction can be carried out either batchwise or continuous, preferably the latter. In carrying out the process as a continuous one, it is to be understood that hydrogen in the effluent product can be separated and recycled.

The following specific examples are intended to illustrate the advantages of the above-described catalysts of this invention.

EXAMPLE I

CATALYST PREPARATION

Several invention catalysts and comparison catalysts were prepared by impregnating low density alumina with appropriate amounts of chloroplatinic acid, chloroauric acid and germanium oxide dissolved in chlorine water. Hydrogen chloride equivalent to 0.6 weight percent of the alumina was also added to the impregnating solution. The germanium component was prepared as described in U.S. Pat. No. 3,578,584. The samples were then calcined at 800°F for 2 hours in an air atmosphere, removed from the furnace, cooled and stored until ready for use. Sulfided samples were prepared from the composites by heating them for 3 hours at 950°F in a stream containing hydrogen and hydrogen sulfide.

EXAMPLE II

DEHYDROCYCLIZATION OF NAPHTHA

Each catalyst was charged to a fixed bed reactor which was quickly brought up to about 700°F as hydrogen flowed through it at atmospheric pressure. The pressure was raised to 325 psig with hydrogen, the hydrocarbon feed was started and the reactor temperature was brought up in increments to the level required to produce a reformate of 95 Research Octane Number (RON) clear. Each run lasted several days, i.e., 5 to about 24 days. The daily temperature increment to maintain 95 RON grade reformate was noted although the values are considered to be relative in view of the small size of the reforming unit. The hydrocarbon feed stream was low sulfur naphtha with an A.P.I. gravity in the range of about 54–56 typically boiling in the range of about 175°–380°F and composed by volume of about 59% paraffins, 22.5% naphthenes and 18.5% aromatics. The following results were obtained.

TABLE I

| | Catalyst Composition, Weight Percent | | | Yield, 95 RON (clear) Reformate (LV%) | Init. Reactor Temp. °F | Temp. Increment Needed °F/Day |
|---|---|---|---|---|---|---|
| Run | Pt | Au | Ge | | | |
| 1 | 0.4 | 0 | 0.3 | 82.5 | 931 | 1.5 |
| 2 (Invention run) | 0.4 | 0.3 | 0.3 | 82.2 | 923 | 1.0 |
| 3 | 0.4 | 0.6 | 0.3 | 83.2 | 924 | 2.0 |
| 4 | 0.4 | 0.6 | 0 | 82.2 | 931 | 1.4 |

Notes: Unsulfided catalysts.
Hydrocarbon feed of 54.4 A.P.I. gravity, 1 ppm sulfur, 46 RON (clear).
LHSV = 2.0–2.1.
$H_2$/naphtha = 7:1 mole ratio.
Pressure = 325 psig.

The results show equivalent performance for each catalyst based upon yield. However, addition of gold to the Pt/Ge catalyst reduces the initial reactor temperature required about seven or eight degrees. Run 2 and Run 4 at equivalent metal loadings show that the combination of gold and germanium is the important factor in the platinum-containing catalysts.

The following results were obtained for the sulfided catalysts:

TABLE II

| Catalyst Composition, Weight Percent | | | | Yield, 95 RON (Clear) Reformate (LV%) | Initial Reactor Temp., °F | Temperature Increment Needed °F/Day |
|---|---|---|---|---|---|---|
| Run | Pt | Au | Ge | | | |
| 5 | 0.4 | 0 | 0 | 81.0 | 955 | 1.5 |
| 6 | 0.4 | 0.3 | 0 | 80.7 | 934 | 1.2 |
| 7 | 0.4 | 0 | 0.3 | 81.2 | 931 | — |
| 8* | 0.4 | 0.3 | 0.3 | 83.9 | 935 | 1.1 |

*Invention run
Notes: Sulfided catalysts.
  Hydrocarbon feed of 55.1 A.P.I. gravity, 2 ppm sulfur, 46 RON (clear).
  LHSV = 2.0–2.1.
  H₂/naphtha = 7:1 mole ratio.
  Pressure = 325 psig.

The results for the sulfided catalysts show admixing either gold or germanium with the platinum catalyst (Runs 6 and 7) gives catalysts with similar yields but that lower initial reactor temperatures are needed compared to the platinum catalyst of Run 5. The invention catalyst in Run 8 shows that adding an equivalent portion of cheaper germanium with more expensive gold gives a somewhat more active catalyst based upon the improved reformate yield.

I claim:

1. The process for the catalytic reforming of hydrocarbons which comprises contacting a naphtha and hydrogen with a catalyst having increased activity and selectivity consisting essentially of a refractory support promoted with platinum, germanium and gold in an amount for each promoter ranging from 0.05 to 2 weight percent at reforming conditions and withdrawing a reformate of improved octane rating.

2. A process according to claim 1 wherein the following reforming conditions prevail:

| | |
|---|---|
| temperature | 600–1100°F |
| pressure | 100–600 psig |
| hydrocarbon rate | 0.2–10 LHSV |
| hydrogen ratio | 0.5–20 moles of hydrogen per mole of hydrocarbon. |

3. A process according to claim 1 wherein the naphtha comprises paraffins of 6 to 12 carbon atoms.

4. A process according to claim 1 wherein the support is alumina and the amount of each platinum, germanium and gold present in the catalyst is in the range 0.1 to 1 weight percent.

5. A process according to claim 1 wherein the catalyst composition is sulfided prior to contacting with naphtha.

6. A process according to claim 1 wherein the naphtha subjected to reforming comprises paraffins, naphthenes and aromatics.

7. A reforming catalyst composition consisting essentially of:
  a. 0.05–1 weight percent platinum,
  b. 0.05–1 weight percent germanium, and
  c. 0.05–1 weight percent gold, incorporated into
  d. a refractory support.

8. A composition according to claim 7 wherein said refractory support is alumina.

9. A composition according to claim 7 wherein the amount of each of (a), (b) and (c) is in the range of 0.1 to 1 weight percent.

* * * * *